(12) United States Patent
De Raeve et al.

(10) Patent No.: US 11,846,297 B2
(45) Date of Patent: Dec. 19, 2023

(54) PROCESS FLUID LUBRICATED PUMP

(71) Applicant: Sulzer Management AG, Winterthur (CH)

(72) Inventors: Karel De Raeve, Winterthur (CH);
Simon Gassmann, Zürich (CH);
Thomas Welschinger, Radolfzell (DE);
Benedikt Trottmann, St. Gallen (CH)

(73) Assignee: SULZER MANAGEMENT AG, Winterthur (CH)

( * ) Notice: Subject to any disclaimer, the term of this patent is extended or adjusted under 35 U.S.C. 154(b) by 188 days.

(21) Appl. No.: 17/209,350

(22) Filed: Mar. 23, 2021

(65) Prior Publication Data
US 2021/0324868 A1 Oct. 21, 2021

(30) Foreign Application Priority Data
Apr. 20, 2020 (EP) ..................................... 20170369

(51) Int. Cl.
*F04D 29/06* (2006.01)
*F04D 1/08* (2006.01)
(Continued)

(52) U.S. Cl.
CPC .......... *F04D 29/061* (2013.01); *E21B 43/128* (2013.01); *F04D 1/08* (2013.01);
(Continued)

(58) Field of Classification Search
CPC ...... F04D 13/086; F04D 29/0416; F04D 1/06; F04D 29/047; F04D 29/061;
(Continued)

(56) References Cited

U.S. PATENT DOCUMENTS 3,874,812 A    4/1975   Hanagarth
4,172,690 A *  10/1979  Kuntz .................. F04D 29/628
                                                          415/176
(Continued)

FOREIGN PATENT DOCUMENTS

CN      106593886 A    4/2017
EP       3726077 A1   10/2020
(Continued)

OTHER PUBLICATIONS

Extended European Search Report dated Oct. 15, 2020 in corresponding European Patent Application No. 20170369.1, filed Apr. 20, 2020.

*Primary Examiner* — Dominick L Plakkoottam
(74) *Attorney, Agent, or Firm* — GLOBAL IP COUNSELORS, LLP

(57) ABSTRACT

A process fluid lubricated pump includes a pump having a pump shaft extending from a drive end to a non-drive end, first and last stage impellers, a drive unit exerting torque on the drive end to rotate the pump shaft, a balance drum connected to the pump shaft between the pump and the drive end, the balance drum defining a drum front side facing the pump and a drum back side, a relief passage between the balance drum and a first stationary part configured to be stationary with respect to a housing, the relief passage extending from the drum front side to the drum back side, the pump shaft radially supported in a non-contacting manner during operation of the pump, and a hydrodynamic radial pump bearing supporting the pump shaft, the radial pump bearing arranged at the non-drive end or at the drive end of the pump shaft.

17 Claims, 12 Drawing Sheets

(51) Int. Cl.
*F04D 29/041* (2006.01)
*F04D 13/08* (2006.01)
*F04D 29/047* (2006.01)
*F04D 29/58* (2006.01)
*E21B 43/12* (2006.01)

(52) U.S. Cl.
CPC ......... *F04D 13/086* (2013.01); *F04D 29/047* (2013.01); *F04D 29/0413* (2013.01); *F04D 29/0416* (2013.01); *F04D 29/0473* (2013.01); *F04D 29/5886* (2013.01)

(58) Field of Classification Search
CPC .. F04D 29/041; F04D 29/0413; F04D 29/044; F04D 13/08; F04D 29/0516; F04D 13/10; F04D 29/051; F04D 25/0686; E21B 43/128; E21B 43/20; E21B 43/121
See application file for complete search history.

(56) References Cited

U.S. PATENT DOCUMENTS

| | | | | |
|---|---|---|---|---|
| 4,715,778 A | * | 12/1987 | Katayama | F04D 29/0516 415/199.1 |
| 6,309,174 B1 | * | 10/2001 | Oklejas, Jr | F04D 29/0416 415/58.4 |
| 2005/0269885 A1 | * | 12/2005 | Knox | H02K 7/083 310/90 |
| 2008/0234623 A1 | * | 9/2008 | Strauss | A61M 60/113 604/6.14 |
| 2015/0143822 A1 | * | 5/2015 | Chalmers | F04D 13/086 417/424.2 |
| 2016/0333677 A1 | * | 11/2016 | Westberg | F04D 13/086 |
| 2016/0348687 A1 | * | 12/2016 | Gassmann | F04D 29/128 |
| 2017/0022997 A1 | * | 1/2017 | Felix | F04D 1/06 |
| 2017/0306966 A1 | * | 10/2017 | Valland | F04D 29/044 |
| 2018/0119737 A1 | * | 5/2018 | Kjellnes | F16C 39/063 |
| 2018/0266428 A1 | * | 9/2018 | Milone | F16C 33/109 |
| 2019/0128275 A1 | * | 5/2019 | Boulden | F04D 29/126 |
| 2019/0277302 A1 | * | 9/2019 | Klepsvik | F04D 29/165 |
| 2020/0011342 A1 | * | 1/2020 | Tokunaga | F16J 15/441 |

FOREIGN PATENT DOCUMENTS

| | | |
|---|---|---|
| EP | 3 808 984 A1 | 4/2021 |
| KR | 200189331 Y1 * | 7/2000 |

* cited by examiner

PROCESS FLUID LUBRICATED PUMP

CROSS-REFERENCE TO RELATED APPLICATION

This application claims priority to European Patent Application No. 20170369.1, filed Apr. 20, 2020, the contents of which are hereby incorporated herein by reference in its entirety.

BACKGROUND

Field of the Invention

The invention relates to a process fluid lubricated pump for conveying a process fluid.

Background Information

Conventional process fluid lubricated pumps for conveying a process fluid are used in many different industries. An important example is the oil and gas processing industry, where process fluid lubricated pumps are designed e.g. as multiphase pumps for conveying hydrocarbon fluids, for example for extracting the crude oil from the oil field or for transportation of the oil/gas through pipelines or within refineries. Another application of process fluid lubricated pumps in the oil and gas industry is the injection of a process fluid, in most cases water and in particular seawater, into an oil reservoir. For such applications, the pumps are designed as water injection pumps supplying seawater at high pressure to a well that leads to a subterranean region of an oil reservoir. A typical value for the pressure increase generated by such a water injection pump is 200-300 bar (20-30 MPa) or even more.

Water injection into oil reservoirs is a well-known method for increasing the recovery of hydrocarbons from an oil or gas field. The injected water maintains or increases the pressure in the reservoir thereby driving the oil or the hydrocarbons towards and out of the production well.

SUMMARY

In some applications, raw seawater is injected into the oil reservoir. However, in many applications the seawater is pretreated to avoid negative impacts on the oil reservoir, such as acidifying the oil, e.g. by hydrogen sulfide ($H_2S$), or blocking pores or small passages in the reservoir, e.g. with sulfates. To achieve the desired seawater quality, the seawater is passed through a series of ever-finer filters providing a microfiltration of the seawater. In addition, biological or electrochemical processes can be used to pretreat the seawater. Usually the final step of the filtration is a nanofiltration, in particular to remove the sulfates from the seawater. Nanofiltration is a membrane filtration process requiring the supply of water to the membrane unit with a pressure of typically 25-50 bar (2.5-5.0 MPa). Particularly for reverse osmosis filtration the required pressure can even be higher. After the nanofiltration process the seawater is supplied to the water injection pump, pressurized and injected into the subterranean region, where the oil reservoir is located. Thus, pretreating and injecting the seawater into the oil reservoir usually requires two pumps, namely a membrane feed pump for supplying the membrane filtration unit with the seawater and a water injection pump for suppling the filtered seawater to the well for introducing the seawater into the oil reservoir.

In view of an efficient exploitation of oil and gas fields, there is nowadays an increasing demand for pumps and in particular water injection pumps that can be installed directly on the sea ground in particular down to a depth of 500 m, down to 1000 m or even down to more than 2000 m beneath the water surface. Needless to say that the design of such pumps is challenging, in particular because these pumps shall operate in a difficult subsea environment for a long time period with as little as possible maintenance and service work. This requires specific measures to minimize the amount of equipment involved and to optimize the reliability of the pump. In view of water injection pumps deployed on the sea ground and the pretreatment of the seawater, the membrane feed pump might be dispensed with, if the seawater injection system is installed in such a depth that the ambient water pressure is sufficient to feed the membrane filtration unit. For example, in 500 m below the water surface the hydrostatic pressure of the seawater is already about 50 bar, which might be high enough to feed the membrane filtration unit.

Water injection pumps for subsea applications have to deliver quite a high pressure increase, which might be 200 bar or even more. For centrifugal pumps this requires high speed but relatively little speed variation. For driving such pumps it is known to use liquid filled or flooded induction motors or permanent magnet motors. It goes without saying that for subsea installations on the sea ground the reliability of a pump and the minimization of wear and degradation within the pump are of utmost importance.

Large efforts are made to optimize such pumps for subsea applications regarding robustness, weight, length, efficiency and susceptibility to damage. Furthermore, the complexity of the pump should be minimized without jeopardizing operational safety and reliability.

It is therefore an object of the invention to propose an improved or an alternative process fluid lubricated pump that is in particular suited for subsea applications and for deployment on the sea ground. The pump shall have a low complexity with regard to the equipment, low wear and a high reliability in operation. In particular, the pump should be suited to be configured as a water injection pump for injecting seawater in a subterranean region.

The subject matter of the invention satisfying these objects is characterized by the features disclosed herein.

Thus, according to an embodiment of the invention, a process fluid lubricated pump is proposed for conveying a process fluid, having a common housing, a pump unit arranged in the common housing, and a drive unit arranged in the common housing, wherein the common housing comprises an inlet and an outlet for the process fluid, wherein the pump unit comprises a pump shaft extending from a drive end to a non-drive end of the pump shaft and configured for rotating about an axial direction, the pump unit further comprising at least a first stage impeller fixedly mounted on the pump shaft, and a last stage impeller fixedly mounted on the pump shaft, and optionally at least one intermediate stage impeller fixedly mounted on the pump shaft between the first stage impeller and the last stage impeller, wherein the drive unit is configured to exert a torque on the drive end of the pump shaft for driving the rotation of the pump shaft, wherein a balance drum is fixedly connected to the pump shaft between the pump unit and the drive end of the pump shaft, the balance drum defining a drum front side facing the pump unit and a drum back side, wherein a relief passage is provided between the balance drum and a first stationary part configured to be stationary with respect to the common housing, the relief passage extending from the drum front side to the drum back side, wherein the pump unit comprises at most one radial pump bearing for supporting the pump shaft, wherein the at most one radial pump bearing is arranged at the non-drive end or at the drive end of the pump shaft.

In particular, according to the invention a process fluid lubricated pump is proposed for conveying a process fluid, having a common housing, a pump unit arranged in the common housing, and a drive unit arranged in the common housing, wherein the common housing comprises an inlet and an outlet for the process fluid, wherein the pump unit comprises a pump shaft extending from a drive end to a non-drive end of the pump shaft and configured for rotating about an axial direction, the pump unit further comprising at least a first stage impeller fixedly mounted on the pump shaft, and a last stage impeller fixedly mounted on the pump shaft, and optionally at least one intermediate stage impeller fixedly mounted on the pump shaft between the first stage impeller and the last stage impeller, wherein the drive unit is configured to exert torque on the drive end of the pump shaft for driving the rotation of the pump shaft, wherein a balance drum is fixedly connected to the pump shaft between the pump unit and the drive end of the pump shaft, the balance drum defining a drum front side facing the pump unit and a drum back side, wherein a relief passage is disposed between the balance drum and a first stationary part configured to be stationary with respect to the common housing, the relief passage extending from the drum front side to the drum back side, wherein the pump shaft is radially supported in a non-contacting manner during operation of the pump, wherein the pump unit comprises at most one hydrodynamic radial pump bearing for supporting the pump shaft, wherein the at most one radial pump bearing is arranged at the non-drive end or at the drive end of the pump shaft.

Thus, as compared to pumps known from the prior art having at least two radial bearings for supporting the pump shaft with respect to the radial direction, the pump according to the invention has at most one radial bearing, which is arranged at the non-drive end or at the drive end of the pump shaft. In the pump according to the invention there is no radial pump bearing at the drive end of the shaft and/or no radial pump bearing at the non-drive end of the pump shaft. Therefore, the number of radial bearings for supporting the pump shaft is reduced at least by one radial bearing.

Radial bearings, which are also designated as journal bearings, are complex, highly expensive components of a pump. A radial bearing is one of the components which impacts the mean time between maintenance. Thus, reducing the number of radial bearings for the pump shaft, reduces the complexity of the pump as well as the likelihood of a failure of the pump. Furthermore, the reduced number of radial bearings considerably reduces the costs for the pump. By reducing the number of radial bearings, the shaft as well as the pressure casing reduce in length, which reduces the weight of the unit. This has an impact on material cost as well as installation costs.

The feature that the pump shaft is radially supported in a non-contacting manner shall indicate that the pump shaft is supported with respect to the radial direction e.g. only by fluid bearings or support devices, where a fluid is between the rotating pump shaft and the surrounding stationary part, so that there is no direct contact between the rotating pump shaft and the surrounding stationary part. In particular, the pump according to the invention is free of anti-friction bearings (e.g. ball bearings) for supporting the pump shaft with respect to the radial direction.

It is preferred that the pump comprises at least one hydrostatic support device for providing a radial support to the pump shaft, wherein the hydrostatic support device is preferably configured to provide the support by the Lomakin effect. Different from hydrodynamic radial bearings, which require rotation of the pump shaft to generate the radial bearing forces, a hydrostatic support device does not require rotation of the pump shaft for supporting the pump shaft with respect to the radial direction, but a pressure drop across the supporting device with respect to the axial direction. As it is known in the art, for example, the Lomakin effect requires a pressure drop along an annular gap for the fluid arranged between the pump shaft and a stationary part surrounding the pump shaft. The conventional hydrodynamic radial bearing does not require a mentionable pressure drop across the radial bearing, but needs the rotation of the shaft.

According to a preferred configuration the pump unit is configured without a hydrodynamic radial pump bearing, wherein the hydrostatic support device comprises a first throttle bush, which is fixedly connected to the pump shaft between the first stage impeller and the non-drive end of the pump shaft or at the non-drive end, the first throttle bush defining a first throttle front side facing the first stage impeller and a first throttle back side, wherein a first throttle passage is disposed between the first throttle bush and a first stationary throttle part configured to be stationary with respect to the common housing, the first throttle passage extending from the first throttle front side to the first throttle back side, and wherein a supply line is disposed configured to supply pressurized process fluid to the first throttle back side.

In this preferred configuration there is no radial bearing at all for the pump shaft, which considerably reduces the complexity as well as the cost for the pump. With the first throttle bush at the non-drive end of the pump shaft it is possible to center the pump shaft by the Lomakin effect in such a manner that no radial bearing is required for the pump shaft. So the usage of this throttle bush allows for removing both journal bearings, which are required in prior art devices.

According to a preferred design, a second throttle bush is fixedly connected to the pump shaft between the first throttle bush and the non-drive end of the pump shaft or at the non-drive end, the second throttle bush defining a second throttle back side, being different from the first throttle back side, wherein a second throttle passage is disposed between the second throttle bush and a second stationary throttle part configured to be stationary with respect to the common housing, the second throttle passage extending from the first throttle back side to the second throttle back side. By providing the first and the second throttle bush, the effect of centering the pump shaft by the Lomakin effect and therewith the rotordynamic performance can even be improved.

Preferably, the supply line is in fluid communication with a first intermediate take-off arranged at a discharge side of the first stage impeller or at a discharge side of any of the intermediate stage impellers. Extracting the pressurized process fluid from the discharge side of either the first stage impeller or one of the intermediate stage impellers is a very simple measure to provide the first throttle back side with pressurized process fluid. For many applications the pressure at the discharge of the first stage impeller, i.e. the pressure between the first stage impeller and the next stage impeller is sufficient to generate a flow through the first and/or the second throttle passage that results in a Lomakin effect being strong enough to keep the pump shaft in a centered position.

According to a particularly preferred embodiment, the pump is designed as a seal-less pump without a mechanical seal. A mechanical seal is usually used for the sealing of the rotating shaft of a pump and shall prevent the leakage of the process fluid along the pump shaft of the pump. Typically, a mechanical seal comprises a stator and a rotor. The rotor is connected in a torque-proof manner with the shaft of the pump and the stator is fixed with respect to the pump housing such that the stator is secured against rotation. During rotation of the pump shaft the rotor is in sliding contact with the stator thus performing the sealing action. Although such mechanical seals are widely spread within the technology of centrifugal pumps they are somewhat problematic for subsea applications because they are quite complicated and usually require additional equipment, which is often considered as a drawback for subsea applications. Therefore, it is preferred that the pump according to the invention is designed as a seal-less pump, i.e. a pump that has no mechanical seal. In many applications this requires that the pump unit and the drive unit are flooded with the process fluid. The advantage of the seal-less pump is the simpler design of the pump. In addition, the process fluid itself can be used for cooling and lubricating components of the pump, e.g. the bearings of the pump shaft and the drive unit of the pump.

It is a preferred measure, that a cooling line is configured to supply pressurized process fluid to the drive unit. Thus, the process fluid is also used to cool the drive unit of the pump.

Preferably, the cooling line is in fluid communication with the first intermediate take-off arranged at a discharge side of the first stage impeller or at a discharge side of any of the intermediate stage impellers. Extracting the pressurized process fluid from the discharge side of either the first stage impeller or one of the intermediate stage impellers is a very simple measure to provide the drive unit with pressurized process fluid to cool the drive unit and to lubricate bearings in the drive unit. The location of the first intermediate take-off is flexible, it can be at the outlet of one of the impellers or in the side room of the impeller or at the diffuser outlet. The location is chosen in function of practical design considerations.

According to a preferred design the drive unit comprises a drive shaft, an electric motor configured for rotating the drive shaft about the axial direction, a first and an second motor bearing unit for supporting the drive shaft, wherein the drive shaft is connected to the drive end of the pump shaft, wherein the electric motor is arranged between the first motor bearing unit and the second motor bearing unit, and wherein the drive unit is configured to receive process fluid from the cooling line first for at least lubricating the first and the second motor bearing unit.

It is an advantageous measure that drive unit comprises at least one throttle gap, which is configured to control the flow of the process fluid from the cooling line through the drive unit. In many embodiments the pressure in the cooling line is quite high. Even if the process fluid for the cooling line is extracted at the discharge side of the first stage impeller, the pressure at this location can be for example 40 bar (4 MPa). Without any additional measure this pressure would result in a very high flow of process fluid through the drive unit, which also would considerably reduce the efficiency of the pump. Therefore, the throttle gap in the drive unit restricts or controls the flow of process fluid through the drive unit.

According to a preferred design, the first or the second motor bearing unit comprises an axial bearing, wherein the axial bearing is configured to comprise the at least one throttle gap. Thus, the throttle gap can be included into the axial bearing for the drive shaft.

Furthermore, it is a preferred design that the pump comprises a first set of impellers and a second set of impellers, wherein the first set of impellers and the second set of impellers are arranged in a back-to-back arrangement, so that an axial thrust generated by the first set of impellers is directed opposite to an axial thrust generated by the second set of impellers.

Regarding the back-to-back arrangement it is advantageous to provide a center bush, which is fixedly connected to the pump shaft between the first set of impellers and the second set of impellers, wherein a balancing passage is provided between the center bush and a second stationary part configured to be stationary with respect to the common housing. The center bush with the balancing passage also contributes to center the pump shaft and to reduce the overall axial thrust acting upon the pump shaft.

In addition, the center bush supports the rotordynamic stability both with respect to stiffness and damping in particular of rotor vibrations. The rotor is the entity of the rotating parts of the pump unit, i.e. in particular all impellers as well the pump shaft are part of the rotor of the pump unit.

According to a preferred embodiment the pump is configured as a vertical pump with the pump shaft extending in the direction of gravity, wherein the drive unit is arranged on top of the pump unit.

According to a preferred application the pump is configured as a subsea pump and preferably configured for installation on a sea ground.

Furthermore, it is preferred that the pump is configured as a water injection pump for injecting the process fluid, preferably seawater, into a subterranean region.

Further advantageous measures and embodiments of the invention will become apparent from the present disclosure.

BRIEF DESCRIPTION OF THE DRAWINGS

The invention will be explained in more detail hereinafter with reference to the drawings.

DETAILED DESCRIPTION

Figure 1:
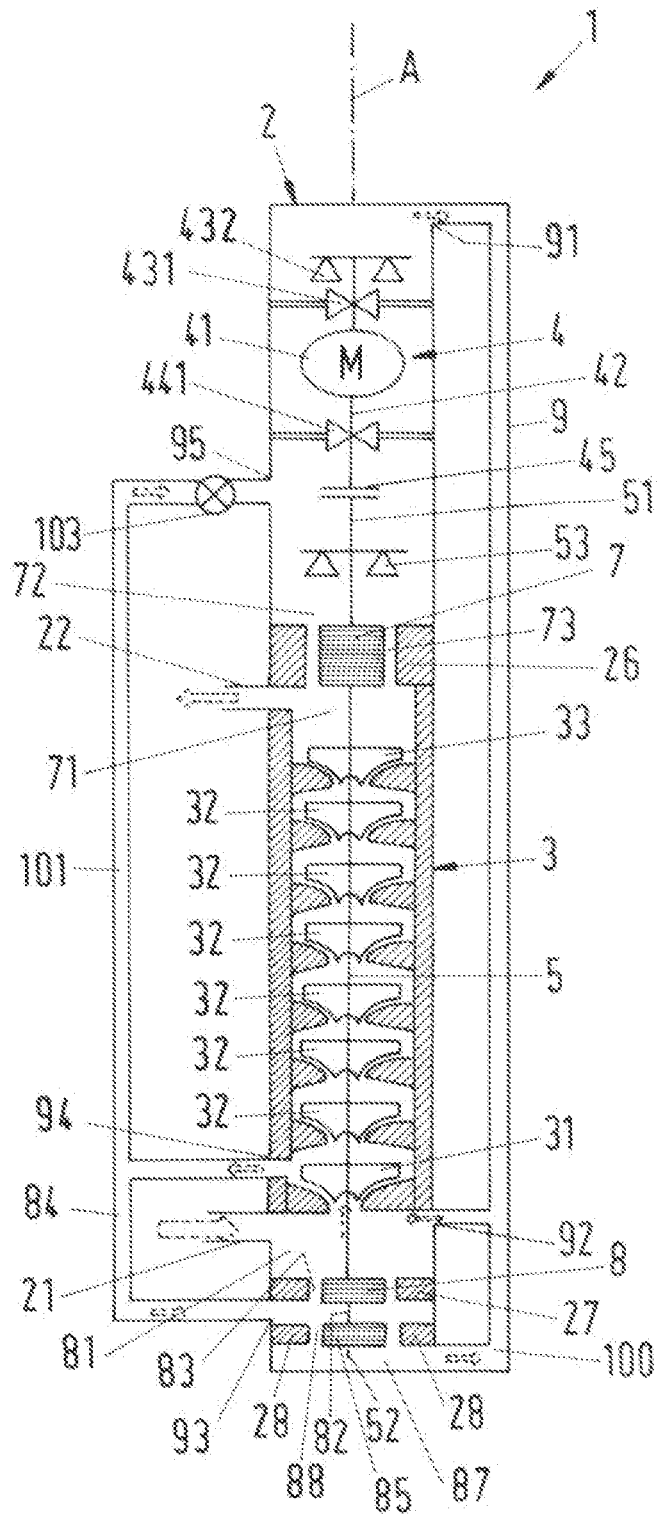
FIG. 1 is a schematic cross-sectional view of a first embodiment of a process fluid lubricated pump according to the invention.

FIG. 1 shows a schematic cross-sectional view of a first embodiment of a process fluid lubricated pump according to the invention, which is designated in its entity with reference numeral 1. The pump 1 is designed as a centrifugal pump for conveying a process fluid and has a common housing 2, a pump unit 3 and a drive unit 4. Both the pump unit 3 and the drive unit 4 are arranged within the common housing 2. The common housing 2 is designed as a pressure housing, which is able to withstand the pressure generated by the pump 1 as well as the pressure exerted on the pump 1 by the environment. The common housing 2 can comprise several housing parts, e.g. a pump housing and a drive housing, which are connected to each other to form the common housing 2 surrounding the pump unit 3 and the drive unit 4. It is also possible that a pump housing and a drive housing are inserted into a barrel housing which forms the common housing 2 of the pump 1.

In the following description reference is made by way of example to the important application that the process fluid lubricated pump 1 is designed and adapted for being used as a subsea water injection pump 1 in the oil and gas industry, in particular for injecting water into a subterranean oil and/or gas reservoir to increase recovery of hydrocarbons from the subterranean region. By injecting the water into the reservoir, the hydrocarbons are forced to flow towards and out of the production well. Accordingly, the process fluid that is conveyed by the pump 1 is water and especially seawater. The process fluid lubricated pump 1 is in particular configured for installation on the sea ground, i.e. for use beneath the water surface, in particular down to a depth of 200 m, down to 1000 m or even down to more than 2000 m beneath the water surface of the sea.

It goes without saying that the invention is not restricted to this specific example but is related to process fluid lubricated pumps in general. The invention can be used for many different applications, especially for such applications where the pump 1 is installed at locations, which are difficult to access. Preferably, the pump 1 according to embodiments of the invention is designed as a water injection pump. Even if preferred, the pump 1 is not necessarily configured for deployment on the sea ground or for subsea applications, but can also be configured for top side applications, e.g. for an installation ashore or on an oil platform, in particular on an unmanned platform. In addition, the pump 1 according to the invention can also be used for applications outside the oil and gas industry.

The term "process fluid lubricated pump" refers to pumps, where the process fluid that is conveyed by the pump 1 is used for the lubrication and the cooling of components of the pump, e.g. bearings. A process fluid lubricated pump 1 does not require a specific barrier fluid different from the process fluid to avoid leakage of the process fluid e.g. into the drive unit 4. In addition, a process fluid lubricated pump 1 does not require a lubricant different from the process fluid for the lubrication of the pump components. In the following description reference is made by way of example to the important application that the process fluid is water, in particular seawater. The term seawater comprises raw seawater, purified seawater, pretreated seawater, filtered seawater, in particular microfiltered seawater and nanofiltered seawater. Of course, the pump 1 according to embodiments of the invention can also be configured for conveying other process fluids than water or seawater, such as super-critical carbon dioxide or any other super-critical fluid.

The common housing 2 of the pump 1 comprises an inlet 21, through which the process fluid enters the pump 1, and an outlet 22 for discharging the process fluid with an increased pressure as compared to the pressure of the process fluid at the inlet 21. Typically, the outlet 22 is connected to a pipe (not shown) for delivering the pressurized process fluid to a well, in which the process fluid is injected. The pressure of the process fluid at the outlet 22 is referred to as 'high pressure' whereas the pressure of the process fluid at the inlet 21 is referred to as 'low pressure'. A typical value for the difference between the high pressure and the low pressure is for example 100 to 200 bar (10-20 MPa).

The pump unit 3 further comprises a pump shaft 5 extending from a drive end 51 to a non-drive end 52 of the pump shaft 5. The pump shaft 5 is configured for rotating about an axial direction A, which is defined by the longitudinal axis of the pump shaft 5.

The pump unit 3 further comprises at least a first stage impeller 31 fixedly mounted on the pump shaft 5 as well as a last stage impeller 33 fixedly mounted on the pump shaft 5. The first stage impeller 31 is the impeller 31 next to the inlet 21 and the last stage impeller 33 is the impeller 33 next to the outlet 22 pressurizing the process fluid to the high pressure.

Optionally the pump unit 3 further comprises one or more intermediate stage impeller(s) 32. Each intermediate stage impeller 32 is arranged between the first stage impeller 31 and the last stage impeller 33 when viewed in the direction of increasing pressure, i.e. the direction of the main fluid flow through the pump unit 3. In the first embodiment six intermediate stage impellers 32 are provided, i.e. the pump 1 is configured as an eight stage pump 1. It goes without saying that the number of eight stages is only exemplary. The pump 1 can be designed also as a multistage pump having more or less than eight stages. In the first embodiment the pump unit 3 comprises eight impellers 31, 32, 33 arranged one after another on the pump shaft 5. In particular the impellers 31, 32, 33 are arranged in an inline arrangement. In an inline arrangement the axial thrust generated by the action of the rotating impellers 31, 32, 33 has the same direction for each particular impeller 31, 32, 33.

The drive unit 4, which will be explained in more detail hereinafter, is configured to exert a torque on the drive end 51 of the pump shaft 5 for driving the rotation of the pump shaft 5 and the impellers 31, 32, 33 about the axial direction A.

The process fluid lubricated pump 1 is configured as a vertical pump 1, meaning that during operation the pump shaft 5 is extending in the vertical direction, which is the direction of gravity. Thus, the axial direction A coincides with the vertical direction.

A direction perpendicular to the axial direction is referred to as radial direction. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. Hereinafter relative terms regarding the location like "above" or "below" or "upper" or "lower" or "top" or "bottom" refer to the usual operating position of the pump 1. FIG. 1 and FIG. 3-14 show different embodiments and variants of the pump 1 in their respective usual operating position.

Referring to this usual orientation during operation and as shown in FIG. 1 the drive unit 4 is located above the pump unit 3. However, in other embodiments the pump unit 3 can be located on top of the drive unit 4.

The inlet 21 is arranged at the lower end of the pump unit 3, and the outlet 22 is located at the upper end of the pump unit 3.

According to embodiments of the invention, the process fluid lubricated pump 1 comprises at most one hydrodynamic radial pump bearing for supporting the pump shaft 5 with respect to the radial direction, i.e. the pump unit 3 comprises either exactly one hydrodynamic radial bearing or no radial bearing. The first embodiment of the process fluid lubricated pump 1 is configured without any hydrodynamic radial pump bearing for the pump shaft 5.

In process fluid lubricated pumps known from the prior art there are usually two conventional radial bearings for supporting the pump shaft, one at the drive end of the pump shaft and one at the non-drive end of the pump shaft. The radial bearings support the pump shaft with respect to the radial direction.

A radial bearing is also referred to as a "journal bearing" and an axial bearing, is also referred to as an "thrust bearing".

In prior art pumps the radial pump bearings are configured as friction bearings, or as ball bearings or as hydrodynamic bearings, in particular as tilting pad bearings. The characterizing feature of a hydrodynamic radial bearing is that the rotation of the pump shaft is required to generate the bearing forces. By the rotation of the pump shaft a liquid wedge is created between the pump shaft and a stationary sealing component. This wedge lifts the pump shaft so that a hydrodynamic bearing is realized. Hydrodynamic bearings can be configured e.g. as tilting pad bearing, as cylindrical sleeve bearing or as multi lobe bearing.

According to the invention the pump 1 comprises at most one of such a hydrodynamic radial pump bearing. In addition, the pump shaft 5 is radially supported in a non-contacting manner meaning that the pump shaft 5 is supported with respect to the radial direction without a direct contact between the rotating pump shaft 5 and the surrounding stationary part. The pump shaft 5 is preferably supported with respect to the radial direction only by fluid bearings or support devices, where a fluid is between the rotating pump shaft 5 and the surrounding stationary part.

The pump 1 further comprises an axial pump bearing 53 (see FIG. 1) for supporting the pump shaft 5 with respect to the axial direction A. Preferably the axial pump bearing 53 is configured as a hydrodynamic bearing, and even more preferred as a tilting pad bearing 53. The axial pump bearing 53 is arranged near or at the drive end 51 of the pump shaft 5.

The pump 1 further comprises a balance drum 7 for at least partially balancing the axial thrust that is generated by the impellers 31, 32, 33 during operation of the pump 1. The balance drum 7 is fixedly connected to the pump shaft 5 and arranged between the pump unit 3 and the drive end 51 of the pump shaft 5. The balance drum 7 defines a drum front side 71 and a drum back side 72. The drum front side 71 is the side or the space facing the last stage impeller 33. The drum back side 72 is the side or the space facing the drive unit 4. The balance drum 7 is surrounded by a first stationary part 26, so that a relief passage 73 is formed between the radially outer surface of the balance drum 7 and the first stationary part 26. The first stationary part 26 is configured to be stationary with respect to the common housing 2. The relief passage 73 forms an annular gap between the outer surface of the balance drum 7 and the first stationary part 26 and extends from the drum front side 71 to the drum back side 72. The drum front side 71 is in fluid communication with the outlet 22, so that the axial surface of the balance drum 7 facing the drum front side 71 is exposed essentially to the high pressure prevailing at the outlet 22 during operation of the pump 1. Of course, due to smaller pressure losses caused by the fluid communication between the outlet 22 and the balance drum 7 the pressure prevailing at the axial surface of the balance drum 7 facing the drum front side 71 can be somewhat smaller than the high pressure. However, the considerably larger pressure drop takes place over the balance drum 7. At the drum back side 72 an intermediate pressure prevails during operation of the pump 1. The intermediate pressure has a value, which is between the low pressure at the inlet 21 and the high pressure at the outlet 22.

Since the drum front side 71 is exposed essentially to the high pressure at the outlet 22, a pressure drop exists over the balance drum 7 resulting in a force that is directed upwardly in the axial direction A and therewith counteracts the downwardly directed axial thrust generated by the impellers 31, 32, 33 during operation of the pump 1.

The flow passing through the relief passage 73 is guided through the axial pump bearing 53 for cooling and lubricating the axial pump bearing 53 and then through the drive unit 4 for cooling and lubricating the drive unit 4. After having passed through the drive unit 4, the flow can pass through a first port 91. A balance line 9 is connected to the first port 91 for recirculating the process fluid leaving the drive unit 4 to the low pressure side of the pump 1. The balance line 9 is further connected to a second port 92, which is in fluid communication with the inlet 21 or with any other location, at which the low pressure prevails. Thus, the flow recirculated through the balance line 9 can reenter the pump 1.

In addition, the pump unit 3 comprises at least one hydrostatic support device for providing a radial support to the pump shaft. In the first embodiment the hydrostatic support device comprises a first throttle bush 8, which is fixedly connected to the pump shaft 5 between the first stage impeller 31 and the non-drive end 52 of the pump shaft 5 or at the non-drive end 52. The first throttle bush 8 defines a first throttle front side 81 and a first throttle back side 82. The first throttle front side 81 is the side or the space facing the first stage impeller 31. The first throttle back side 82 is the side or the space facing the non-drive end 52 of the pump shaft 5. The first throttle bush 8 is surrounded by a first stationary throttle part 27, so that a first throttle passage 83 is formed between the radially outer surface of the first throttle bush 8 and the first stationary throttle part 27. The first stationary throttle part 27 is configured to be stationary with respect to the common housing 2. The first throttle passage 83 forms an annular gap between the outer surface of the first throttle bush 8 and the first stationary throttle part 27 and extends from the first throttle front side 81 to the first throttle back side 82. The first throttle front side 81 is in fluid communication with the inlet 21, so that the axial surface of the first throttle bush 8 facing the first throttle front side 81 is exposed essentially to the low pressure prevailing at the inlet 21 during operation of the pump 1.

Furthermore, the pump unit 3 comprises a second throttle bush 85, which is fixedly connected to the pump shaft 5 between the first throttle bush 8 and the non-drive end 52 of the pump shaft 5 or at the non-drive end 52. The second throttle bush 85 defines a second throttle front side, which is identical with the first throttle back side 82, and a second throttle back side 87, being different from the first throttle back side 82. The second throttle back side 87 is the side or the space facing the non-drive end 52 of the pump shaft 5. The second throttle bush 85 is surrounded by a second stationary throttle part 28, so that a second throttle passage 88 is formed between the radially outer surface of the second throttle bush 85 and the second stationary throttle part 28. The second stationary throttle part 28 is configured to be stationary with respect to the common housing 2. The second throttle passage 88 forms an annular gap between the outer surface of the second throttle bush 85 and the second stationary throttle part 28 and extends from the first throttle back side 82 to the second throttle back side 87. The second throttle back side 87 is in fluid communication with a recycle line 100 for recycling the flow of process fluid to the low pressure side. Thus, the recycle line 100 is also in fluid communication with the pump inlet 21 or with any other location, at which the low pressure prevails. Thus, the flow recirculated through the recycle line 100 can reenter the pump 1. As shown in FIG. 1 it is also possible that the recycle line 100 is connected to the balance line 9.

A supply line 84 is provided, which is configured to supply pressurized process fluid to the first throttle back side 82. The supply line 84 is in fluid communication with a third port 93, located at the first throttle back side 82. The supply line 84 is also in fluid communication with a first intermediate take-off 94 arranged at a discharge side of the first stage impeller 31—as shown in FIG. 1—or at a discharge side of any of the intermediate stage impellers 32 or at a discharge side of the last stage impeller 33. Since the pressurized process fluid is supplied to the first throttle back side 82, i.e. between the first throttle bush 8 and the second throttle bush 85, the first throttle bush 8 will experience an axial force directed upwards in axial direction A, while the second throttle bush 85 will experience an axial force directed downwards in axial direction A. Therefore, this double throttle bush design has the additional advantage, that the axial forces acting on the first throttle bush 8 and the second throttle bush 85, respectively, compensate each other at least partially.

For many applications, it is preferred and also sufficient, when the first intermediate take-off 94 is arranged at the discharge side of the first stage impeller 31. The first stage impeller 31 can, for example, generate a pressure increase of 40 bar (4 MPa). This pressure difference is usually sufficient for supplying the throttle passages 83, 88 with pressurized process fluid. Due to the first intermediate take-off 94, the flow through the first stage impeller 31 is higher than the flow through the intermediate stage impellers 32 and the last stage impeller 33. Therefore, it is preferred that the first stage impeller 31 is designed differently than the other impellers 32. Each impeller 31, 32, 33 is preferably configured such that it operates at or close to its best efficiency point. To account for the higher flow through the first stage impeller 31 it is for example possible that the first stage impeller 31 is designed with the same specific speed as the other impellers 32, 33 but with a larger diameter. It is also possible, to design the first stage impeller 31 with the same diameter as the other impellers 32, 33, but with a higher specific speed.

Of course, it is also possible, that all impellers 31, 32, 33 are designed identically. Furthermore, each impeller 31, 32, 33 is designed as a radial impeller 31, 32, 33.

Since the flow passing through the relief passage 73 of the balance drum 7 may not be sufficient for cooling the drive unit 4, it is preferred to provide a cooling line 101, which is configured to supply pressurized process fluid to the drive unit 4. In the first embodiment of the pump 1 the cooling line 101 is in fluid communication with the first intermediate take-off 94.

Thus, the pressurized process fluid discharged through the first intermediate take-off 94 is used both for cooling and lubricating the drive unit 4 and for the supply of the throttle passages 83, 88.

The cooling line 101 is connected to an entrance 95 located between the axial pump bearing 53 and the drive unit 4 (with respect to the axial direction), so that the process fluid leaving the cooling line through the entrance 95 is guided into the drive unit 4 for cooling and lubricating the drive unit 4. After having passed through the drive unit 4 the process fluid is recirculated through the balance line 9 to the low pressure side. Preferably, the cooling line 101 comprises a flow restrictor 103, e.g. a throttle, provided in the cooling line 101 to regulate the flow of process fluid that it passing through the drive unit 4. If the pressure at the first intermediate take-off 94 is for example about 40 bar the flow restrictor 103 delimits the flow through the drive unit 4, so that the loss in hydraulic efficiency is not too large. For most embodiments a small pressure drop over the drive unit 4 of for example only 3 bar is sufficient to provide reliable cooling and lubrication of the drive unit 4.

The supply line 84 connects the first intermediate take-off 94 with the third port 93, so that the pressurized process fluid flows from the first intermediate take-off 94 through the third port 93 to the first throttle back side 82, i.e. into the space between the first throttle bush 8 and the second throttle bush 85. The flow entering through the third port 93 is divided into two partial flows. The first partial flow flows through the first throttle passage 83 to the first throttle front side 81 at the inlet 21, i.e. to the low pressure side, and the second partial flow flows through the second throttle passage 88 and the recycle line 100 to the low pressure side at the inlet 21. If the first throttle bush 8 and the second throttle bush 85 have the same dimensions and the first throttle passage 83 and the second throttle passage 88 have the same dimensions the pressure drop over the first throttle bush 8 is essentially the same as the pressure drop over the second throttle bush 85. The first partial flow through the first throttle passage 83 is directed upwardly in the axial direction A and the second partial flow through the second throttle passage 88 is directed downwardly in the axial direction A.

Both partial flows, i.e. the flow through the first throttle passage 83 and the flow through the second throttle passage 88 generate a centering effect on the pump shaft 5 due to the Lomakin effect. This centering effect is strong enough so that at least one of the two journal pump bearings, which are usually provided in the pumps known from the prior art can be dispensed with. In the first embodiment of the process fluid lubricated pump 1 even both journal pump bearings are dispensed with, i.e. said pump 1 has no journal or radial pump bearing for supporting the pump shaft 5 with respect to the radial direction. The pump shaft 5 is supported with respect to the radial direction by the Lomakin effect generated by the flow through the first throttle passage 83 and the second throttle passage 88, which centers the pump shaft 5. In addition, the flow through the throttle passages 83, 88 also improves the overall rotordynamic performance of the pump 1. The flow through the relief passage 73 along the balance drum 7 also causes a centering effect on the pump shaft 5 due to the Lomakin effect and thus contributes to support the pump shaft 5 with respect to the radial direction.

The flow of the process fluid through the pump 1 including the flow through the balance line 9, the recycle line 100, the supply line 84 and the cooling line 101 is indicated in FIG. 1 by the arrows in dashed lines without reference numeral. Each of the balance line 9, the recycle line 100, the supply line 84 and the cooling line 101 can be configured as an external line that extends at least partially outside the common housing 2 or as an internal line completely extending within the common casing 2.

The fact that the number of radial pump bearings can be at least reduced as compared to conventional pumps is very advantageous, because radial bearings such as radial tilting pad bearings, which are usually used in process fluid lubricated pumps, are very complex, expensive and a potential source of failures.

It has to be noted that the throttle bush 8 or 85, the stationary throttle part 27 or 28 and the throttle passage 83 or 88 constitute a device that cannot be compared with a hydrodynamic radial bearing, because the functional principle is completely different. As already said, in a hydrodynamic journal bearing the rotation of the pump shaft is required to generate the bearing forces. A wedge of lubricant is created between the rotating shaft and a stationary component of the bearing, which lifts the rotating pump shaft from the stationary component of the journal bearing. Thus, the hydrodynamic bearing requires the rotation of the shaft, otherwise it does not work. Furthermore, there is nearly no flow of fluid through the journal bearing, in particular in axial direction A. Only the fluid film between the stationary pads of the bearing and the rotating counterpart has to be cooled, but this results only in a negligible cooling flow. Contrary to that, the device with the throttle bush 8 or 85 is based upon the Lomakin effect, meaning it requires a considerable flow through the throttle passage 83 or 88 as well as a considerable pressure drop over the throttle bush 8 or 85. However, the device with the throttle bush 8 or 85 does not require a rotation of the pump shaft 5 to generate the Lomakin effect which centers the pump shaft 5 with respect to the stationary throttle part 27 or 28, it just requires a pressure difference over the throttle passage 83 or 88.

The device with the throttle bush 8 or 85, the throttle passage 83 or 88 and the stationary throttle part 27 or 28 is considerably simpler and remarkably less complex than a hydrodynamic radial pump bearing. Therefore, dispensing with at least one of the radial pump bearings reduces the complexity and the costs of the pump 1. In addition, the reliability of the pump 1 is enhanced, because the throttle bushes 8, 85 and the throttle passages 83, 88 are less susceptible to failures, thanks to their simple structure.

The process fluid lubricated pump 1 is preferably designed as a seal-less pump. A seal-less pump 1 is a pump that has no mechanical seals for the sealing of the rotating pump shaft 5. A mechanical seal is a seal for a rotating shaft comprising a rotor part fixed to the shaft and rotating with the shaft as well as a stationary stator part fixed with respect to the housing. During operation the rotor part of the mechanical seal and the stator part of the mechanical seal are sliding along each other—usually with a liquid between the seal faces—for providing a sealing action to prevent the process fluid from escaping to the environment or entering the drive of the pump. The seal-less pump 1 shown in FIG. 1 has no such mechanical seals. The process fluid is deliberately allowed to enter the drive unit 4 and is used for cooling and lubricating components of the pump 1 such as the axial pump bearing 53.

Figure 2:
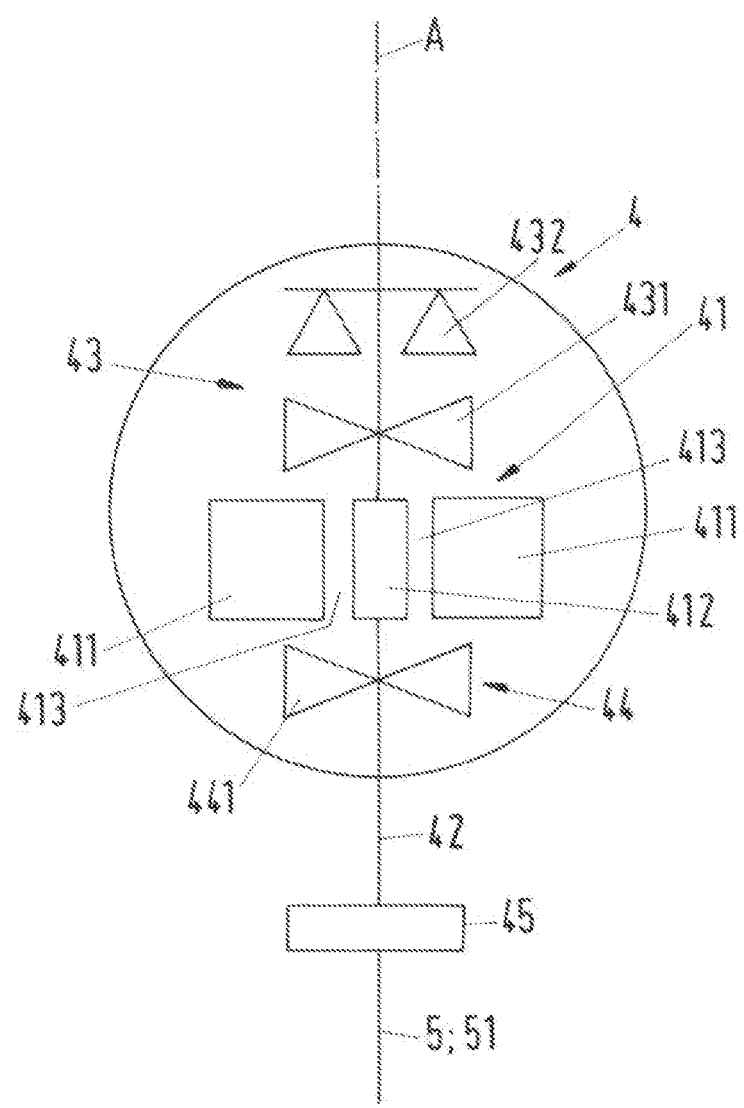
FIG. 2 is a schematic representation of an embodiment of the drive unit.

FIG. 2 shows a schematic representation of an embodiment of the drive unit 4 in more detail.

The drive unit 4 comprises an electric motor 41, a drive shaft 42 extending in the axial direction A, a first motor bearing unit 43 arranged above the electric motor 41 with respect to the axial direction A, and a second motor bearing unit 44 arranged below the electric motor 41. The electric motor 41, which is arranged between the first motor bearing unit 43 and the second motor bearing unit 44, is configured for rotating the drive shaft 42 about the axial direction A. The drive shaft 42 is connected to the drive end 51 of the pump shaft 5 by a coupling 45 for transferring a torque to the pump shaft 5. Preferably the coupling 45 is configured as a flexible coupling 45, which connects the drive shaft 42 to the pump shaft 5 in a torque proof manner, but allows for a relative movement between the drive shaft 42 and the pump shaft 5, e.g. lateral movements. Thus, the flexible coupling 45 transfers the torque but no or nearly no lateral vibrations. The flexible coupling 45 can be configured as a mechanical coupling, a magnetic coupling, a hydrodynamic coupling or any other coupling that is suited to transfer a torque from the drive shaft 42 to the pump shaft 5.

The first motor bearing unit 43 and the second motor bearing unit 44 are configured to support the drive shaft 42 both in radial direction and in the axial direction A. The first motor bearing unit 43 comprises both an upper radial bearing 431 for supporting the drive shaft 42 with respect to the radial direction, and an axial bearing 432 for supporting the drive shaft 42 with respect to the axial direction A. The upper radial bearing 431 and the axial bearing 432 are arranged such that the upper radial bearing 431 is arranged between the axial bearing 432 and the electric motor 41.

Of course, it is also possible, to exchange the position of the upper radial bearing 431 and the axial bearing 432, i.e. to arrange the upper radial bearing 431 above the axial bearing 432. In such a design the axial bearing 432 of the first motor bearing unit 43 is arranged between the upper radial bearing 431 and the electric motor 41.

The upper radial bearing 431 and the axial bearing 432 can be configured as separate bearings, but it is also possible that the upper radial bearing 431 and the axial bearing 432 are configured as a single combined radial and axial bearing supporting the drive shaft 42 both in radial and in axial direction A.

The second motor bearing unit 44 comprises a lower radial bearing 441 for supporting the drive shaft 42 in radial direction. In the embodiment shown in FIG. 2, the second motor bearing unit 44 comprises no axial or thrust bearing. Of course, it is also possible that the second motor bearing unit 44 comprises an axial bearing for the drive shaft 42. In embodiments, where the second motor bearing unit 44 comprises an axial bearing, the first motor bearing unit 43 can be configured without an axial bearing or with an axial bearing.

The electric motor 41 of the drive unit 4 comprises an inwardly disposed rotor 412, which is connected to the drive shaft 42 in a torque proof manner, as well as an outwardly disposed motor stator 411 surrounding the rotor 412 with an annular gap 413 between the rotor 412 and the motor stator 411. The rotor 412 can constitute a part of the drive shaft 42 or is a separate part, which is rotationally fixedly connected to the drive shaft 42, so that the rotation of the rotor 412 drivers the drive shaft 42. The electric motor 41 can be configured as a cable wound motor. In a cable wound motor the individual wires of the motor stator 411, which form the coils for generating the electromagnetic field(s), are each insulated, so that the motor stator 411 can be flooded even with an electrically conducting fluid, e.g. raw seawater. The cable wound motor does not require a dielectric fluid for cooling the motor stator 411. Alternatively, the electric motor 41 can be configured as a canned motor. When the electric drive 41 is configured as a canned motor, the annular gap 413 is radially outwardly delimited by a can (not shown) that seals the motor stator 411 hermetically with respect to the rotor 412 and the gap 413. Thus, any process fluid flowing through the gap 413 cannot enter the motor stator 411. When the electric motor 41 is designed as a canned motor a dielectric cooling fluid different from the process fluid can be circulated through the hermetically sealed motor stator 411 for cooling the motor stator 411.

Preferably, the electric motor 41 is configured as a permanent magnet motor or as an induction motor. To supply the electric motor 41 with energy, a power penetrator (not shown) is provided at the common housing 2 for receiving a power cable (not shown) that supplies the motor 41 with power.

The electric motor 41 can be designed to operate with a variable frequency drive (VFD), in which the speed of the drive, i.e. the frequency of the rotation is adjustable by varying the frequency and/or the voltage supplied to the electric motor 41. However, it is also possible that the electric motor 41 is configured differently, for example as a single speed or single frequency drive.

During operation, the pump 1 is cooled and lubricated by the process fluid, e.g. seawater or water.

The operation of the first embodiment of the pump 1 according to an embodiment of the invention will now be described referring to FIG. 1 to and FIG. 2. The process fluid entering the pump 1 through the inlet 21 is pressurized by the action of the rotating impellers 31, 32, 33 and leaves the pump 1 through the outlet 22. The drum front side 71 below the balance drum 7 is in fluid communication with the outlet 22. Therefore, a part of the pressurized process fluid passes through the relief passage 73 to the back side 72, where the intermediate pressure prevails. The intermediate pressure is larger than the low pressure at the inlet 21. The intermediate pressure corresponds at least approximately to the sum of the low pressure, the pressure drop over the balance line 9, the pressure drop over the drive unit 4 and the pressure drop over the axial pump bearing 53. The intermediate pressure can be for example 5-10 bar higher as the low pressure. In each case the pressure drop over the balance drum 7 is considerably larger than the intermediate pressure. Thus, a force is generated acting upon the pump shaft 5. The force is directed upwardly in axial direction A and therewith at least partially balancing the axial thrust that is generated by the rotating impellers 31, 32, 33 and that is directed downwardly in axial direction A.

A part of the process fluid is discharged through the first intermediate take-off 94 arranged at the discharge side of the first stage impeller 31 and enters both the supply line 84 and the cooling line 101. The flow guided through the supply line 84 passes through the third port 93 and is divided in the first partial flow streaming through the first throttle passage 83 to the low pressure side at the inlet 21, and the second partial flow streaming through the second throttle passage 88 and the recycle line 100 to the low pressure side at the inlet 21. The flow guided through the cooling line 101 is restricted by the flow restrictor 103 and flows through the entrance 95, which is located between the axial pump bearing 53 and the drive unit 4. Here, the flow discharged from the cooling line 101 merges with the flow having passed through the relief passage 73 and the axial pump bearing 53 and enters the drive unit 4. After having passed through the drive unit 4 the process fluid is recirculated to the low pressure side through the balance line 9.

Figure 3:
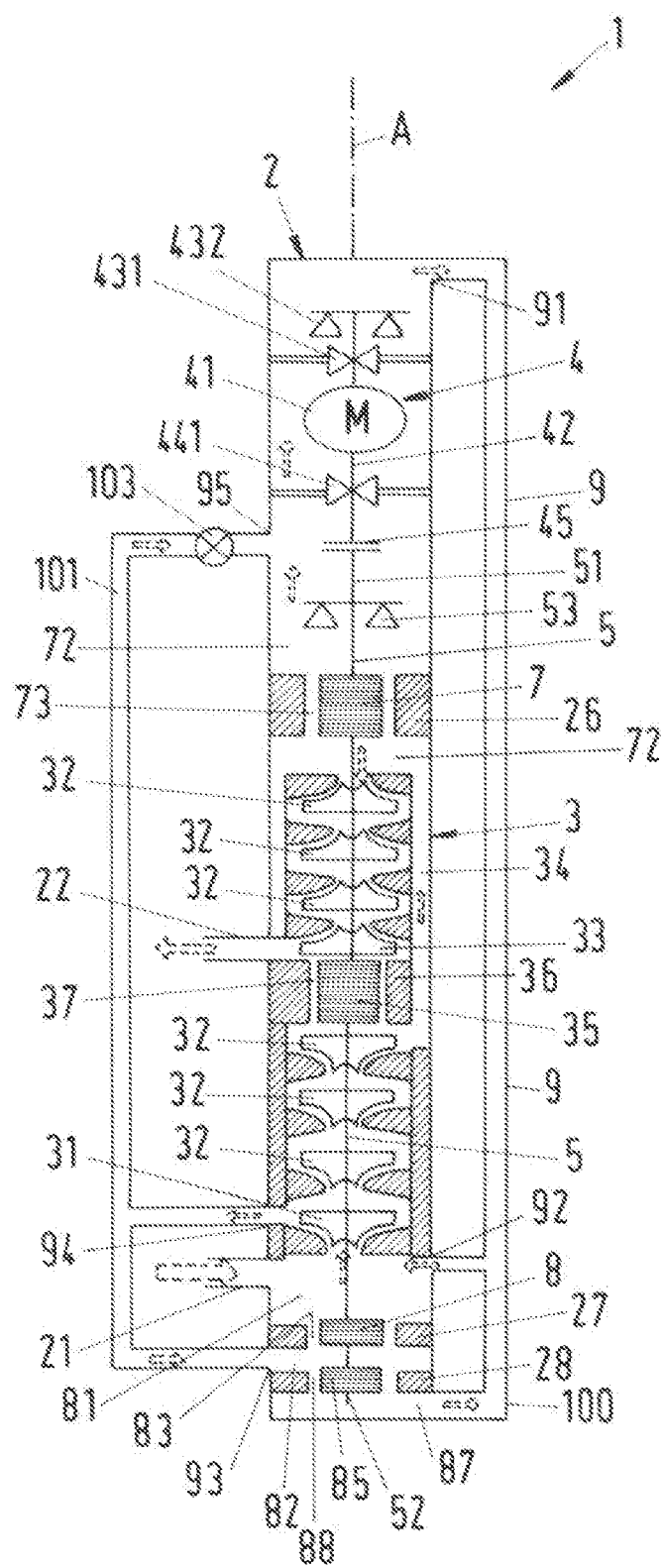
FIG. 3 is a schematic cross-sectional view of a second embodiment of a process fluid lubricated pump according to the invention.

FIG. 3 shows a schematic cross-sectional view of a second embodiment of a process fluid lubricated pump 1 according to the invention.

In the following description of the second embodiment of the process fluid lubricated pump 1 only the differences to the first embodiment are explained in more detail. The explanations with respect to the first embodiment are also valid in the same way or in analogously the same way for the second embodiment. Same reference numerals designate the same features that have been explained with reference to the first embodiment or functionally equivalent features. In particular, the drive unit explained with reference to FIG. 2 can also be used for the second embodiment.

Compared to the first embodiment, it is the main difference, that in the second embodiment of the pump 1 the impellers 31, 32, 33 are arranged in a back-to-back arrangement. The pump unit 3 comprises a first set of impellers 31, 32 and a second set of impellers 32, 33, wherein the first set of impellers 31, 32 and the second set of impellers 32, 33 are arranged on the pump shaft 5 such, that the axial thrust generated by the first set of impellers is directed opposite to the axial thrust generated by the second set of impellers 32, 33. The first set of impellers 31, 32 comprises the first stage impeller 31 and the three intermediate stage impellers 33 of the next three stages and the second set of impellers 32, 33 comprises the last stage impeller 32 and the three intermediate stage impellers 32 of the three preceding stages. In other embodiments the first set of impellers can comprise a different number of impellers than the second set of impellers.

As indicated in FIG. 3 by the dashed arrows without reference numeral, the process fluid enters the pump 1 through the inlet 21 located at the lower end of the pump unit 3, passes the stages one (first stage), two, three and four, is then guided through a crossover line 34 to the suction side of the fifth stage at the upper end of the pump unit 3, passes the stages five, six, seven and eight (last stage), and is then discharged through the outlet 22, which is arranged between the upper end and the lower end of the pump unit 3.

For many applications the back-to-back arrangement is preferred because the axial thrust acting on the pump shaft 5, which is generated by the first set of impellers 31, 32 counteracts the axial thrust, which is generated by the second set of impellers 32, 33. Thus, the two axial thrusts compensate each other at least partially.

It has to be noted that the number of individual impellers 31, 32, 33 forming the first set of impellers 31, 32 and the number of individual impellers forming the second set of impellers 32, 33 can be different or can be the same.

As a further balancing device for reducing the overall axial thrust acting on the pump shaft 5, a center bush 35 is arranged between the first set of impellers 31, 32 and the second set of impellers 32, 33. The center bush 35 is fixedly connected to the pump shaft 5 in a torque proof manner and rotates with the pump shaft 5. The center bush 35 is arranged on the pump shaft 5 between the last stage impeller 33, which is the last impeller of the second set of impellers, and the intermediate stage impeller 32 of the fourth stage, which is the last impeller of the first set of impellers 31, 32, when viewed in the direction of increasing pressure, respectively.

The center bush 35 is surrounded by a second stationary part 36 being stationary with respect to the common housing 2. An annular balancing passage 37 is formed between the outer surface of the center bush 35 and the second stationary part 36.

The function of the center bush 35 and the balancing passage 37 is in principle the same as the function of the balance drum 7 and the relief passage 73. At the axial surface of the center bush 35 facing the last stage impeller 33 the high pressure prevails, and at the other axial surface facing the intermediate impeller 32 of the fourth stage a lower pressure prevails, which is higher than the low pressure and lower than the high pressure, e.g. in the middle between the low pressure and the high pressure. Therefore, the process fluid can pass from the last stage impeller 33 through the balancing passage 37 to the intermediate stage impeller 32 of the fourth stage.

The pressure drop over the center bush 35 results in a force that is directed downwardly in the axial direction A and therewith counteracts the upwardly directed axial thrust generated by the second set of impellers 32, 33, namely the intermediate stage impellers 33 of the fifth, sixth and seventh stage and the last stage impeller 33.

Figure 4:
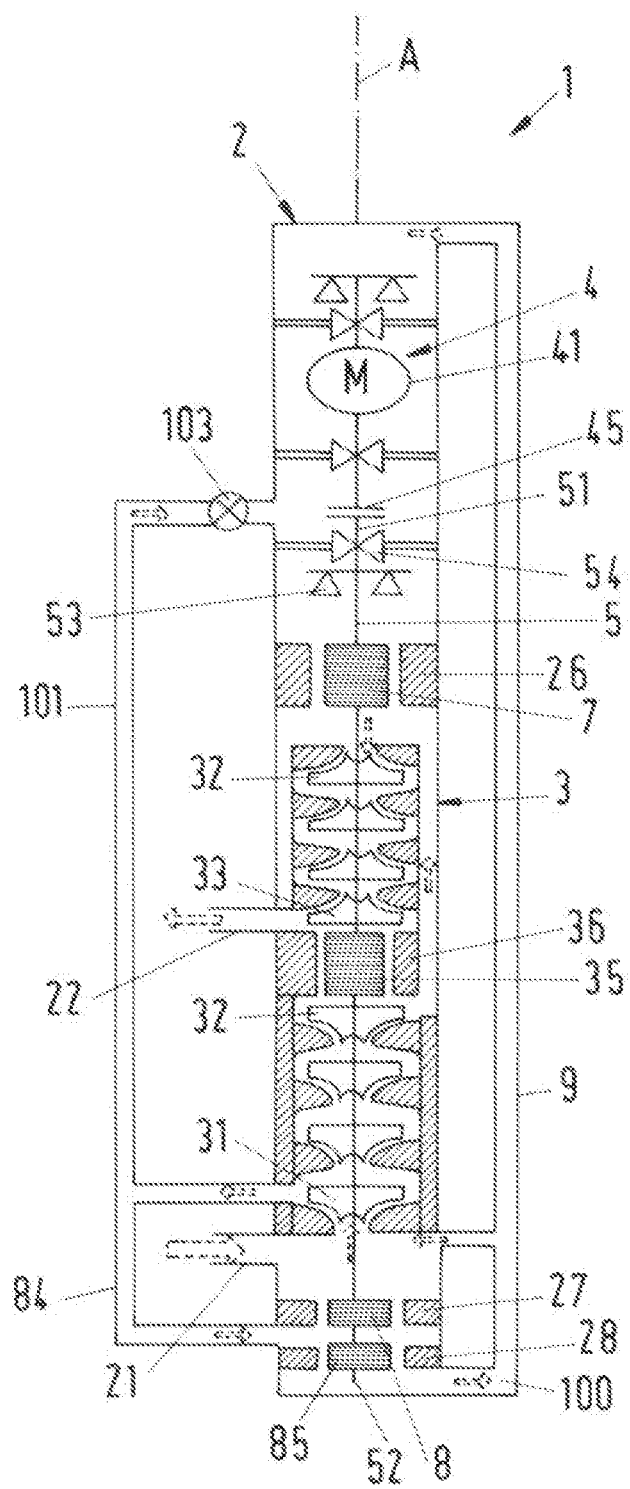
FIG. 4 is a schematic cross-sectional view of a third embodiment of a process fluid lubricated pump according to the invention.

FIG. 4 shows a schematic cross-sectional view of a third embodiment of a process fluid lubricated pump 1 according to the invention.

In the following description of the third embodiment of the process fluid lubricated pump 1 only the differences to the first and the second embodiment are explained in more detail. The explanations with respect to the first embodiment and with respect to the second embodiment are also valid in the same way or in analogously the same way for the third embodiment. Same reference numerals designate the same features that have been explained with reference to the first and the second embodiment or functionally equivalent features. In particular, the drive unit explained with reference to FIG. 2 can also be used for the third embodiment.

In the same manner as in the second embodiment the third embodiment of the pump 1 also has the first set of impellers 31, 32 and the second set of impellers 32, 33 in a back-to-back arrangement. The main difference to the second embodiment is that the third embodiment of the pump 1 comprises a radial pump bearing 54 for supporting the pump shaft 5 with respect to the radial direction. The radial pump bearing 54 is arranged at the drive end 51 of the pump shaft 5, more precisely between the axial pump bearing 53 and the drive end 51 of the pump shaft 5.

Preferably the radial pump bearing 54 is configured as hydrodynamic bearing, and even more preferred as a radial tilting pad bearing.

The process fluid that flows through the relief passage 73 and the axial pump bearing 53 passes also through the radial pump bearing 54 for cooling and lubricating the radial pump bearing 54.

Figure 5:
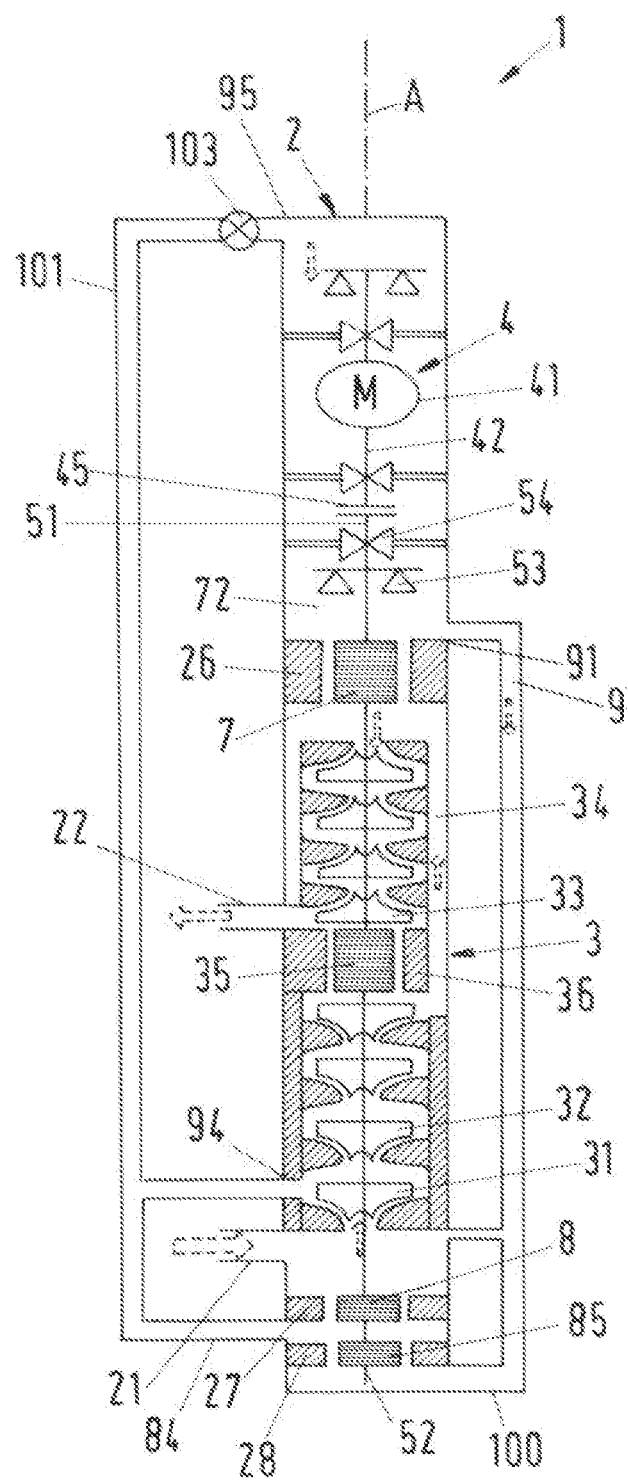
FIG. 5 is a schematic cross-sectional view of a variant of the third embodiment.

FIG. 5 shows a schematic cross-sectional view of a variant of the third embodiment. According to this variant the cooling line 101 for suppling process fluid to the drive unit 4 is connected to the upper end of the drive unit 4, so that the process fluid passes from top to bottom through the drive unit 4.

The first port 91, to which the balance 9 line is connected, is arranged at the drum back side 72, i.e. between the balance drum 7 and the axial pump bearing 53 (with respect to the axial direction A). The process fluid enters the drive unit 4 through the entrance 95, passes through the entire drive unit 4, then through the radial pump bearing 54 and the axial pump bearing 53 and is finally recirculated to the low pressure side through the balance line 9.

The variant shown in FIG. 5 is also applicable to the first and the second embodiment.

Figure 6:
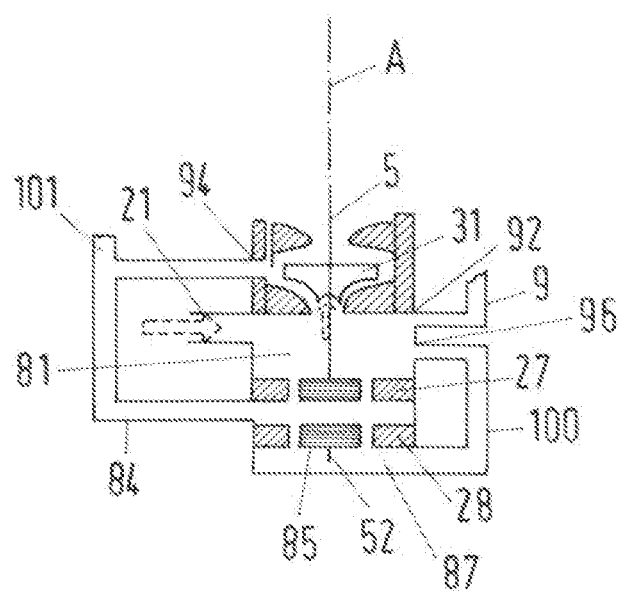
FIG. 6 is a variant for the configuration of the balance line and the recycle line.

FIG. 6 shows a variant for the configuration of the balance line 9 and the recycle line 100. This variant is applicable to all embodiments of the pump 1. According to this variant the recycle line 100 connecting the second throttle back side 87 with the low pressure side at the inlet 21 of the pump 1 is not connected to the balance line 9, but there is an separate fourth port 96 located at the first throttle front side 81, to which the recycle line 100 is connected.

Figure 7:
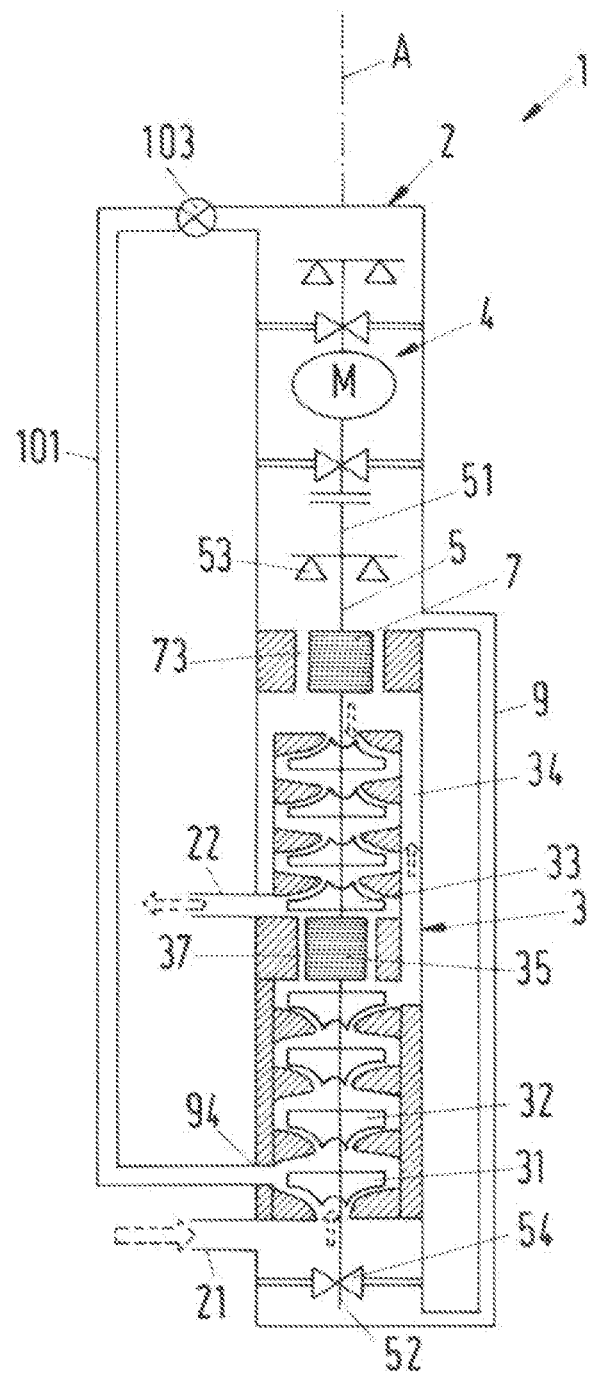
FIG. 7 is a schematic cross-sectional view of a fourth embodiment of a process fluid lubricated pump according to the invention.

FIG. 7 shows a schematic cross-sectional view of a fourth embodiment of a process fluid lubricated pump 1 according to the invention.

In the following description of the fourth embodiment of the process fluid lubricated pump 1 only the differences to the first, the second and the third embodiment are explained in more detail. The explanations with respect to the first embodiment, the second embodiment and the third embodiment are also valid in the same way or in analogously the same way for the fourth embodiment. Same reference numerals designate the same features that have been explained with reference to the first, the second and/or the third embodiment or functionally equivalent features. In particular, the drive unit explained with reference to FIG. 2 can also be used for the fourth embodiment.

The fourth embodiment of the pump 1 is similar to the variant of the third embodiment shown in FIG. 5. However, in the fourth embodiment the radial pump bearing 54 is located at the non-drive end 52 of the pump shaft 5 and there is no radial pump bearing at the drive end 52 of the pump shaft 5. In addition, the fourth embodiment of the pump 1 has neither the first and second throttle bush 8, 85 nor the first and second stationary throttle part 27, 28. Therefore, there is no supply line 84, but only the cooling line 101 is connected to the first intermediate take-off 94. In the fourth embodiment of the pump 1 the pump shaft 5 is supported with respect to the radial direction by the radial pump bearing 54 at the non-drive end 52 of the pump shaft 5 as well as by the flow through the relief passage 73 along the balance drum 7 and the flow through the balancing passage 37 along the center bush 35, which both generate a centering force on the pump shaft 5 due to the Lomakin effect.

Figure 8:
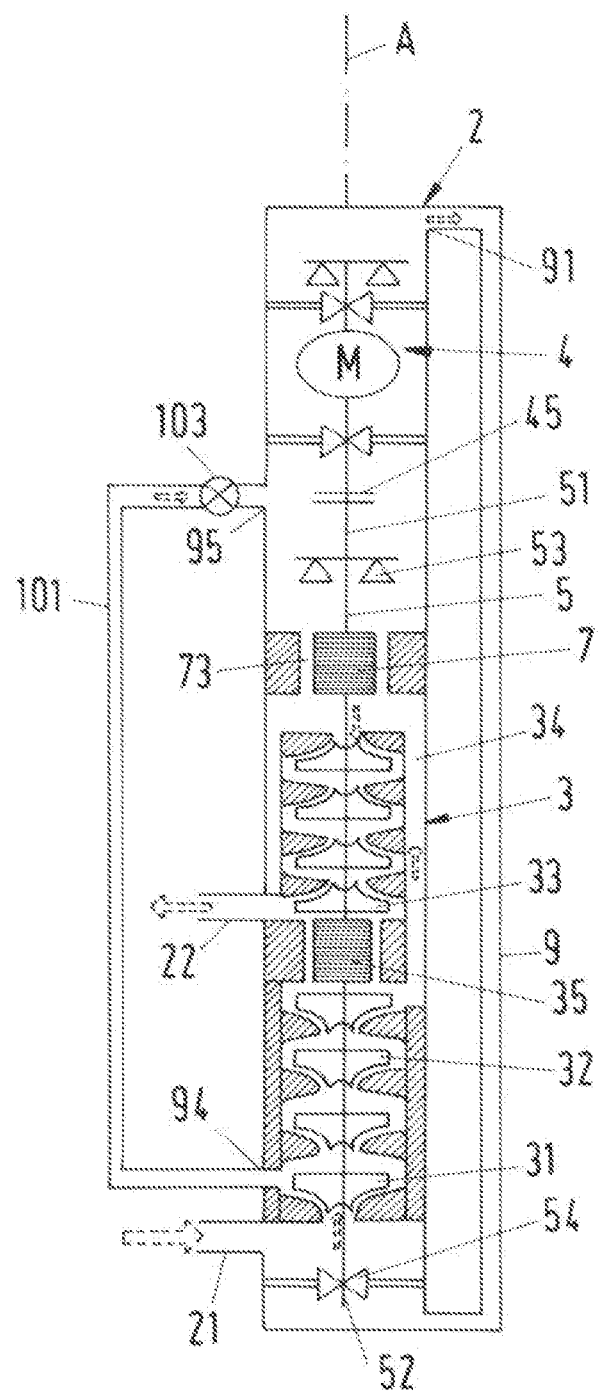
FIG. 8 is a schematic cross-sectional view of a variant of the fourth embodiment.

FIG. 8 shows a cross-sectional view of a variant of the fourth embodiment. Similar to the first embodiment of the pump 1 the entrance 95, to which the cooling line 101 is connected, is located between the axial pump bearing 53 and the drive unit 4 (with respect to the axial direction A), so that the process fluid leaving the cooling line 101 through the entrance 95 is guided into the drive unit 4 for cooling and lubricating the drive unit 4. The first port 91, to which the balance line 9 is connected, is arranged on top of the drive unit 4. The flow discharged from the cooling line 101 through the entrance 95 merges with the flow passing through the relief passage 73 and the axial pump bearing 53 and enters the drive unit 4. After having passed through the drive unit 4 the process fluid is recirculated through the balance line 9 to the low pressure side.

Figure 9:
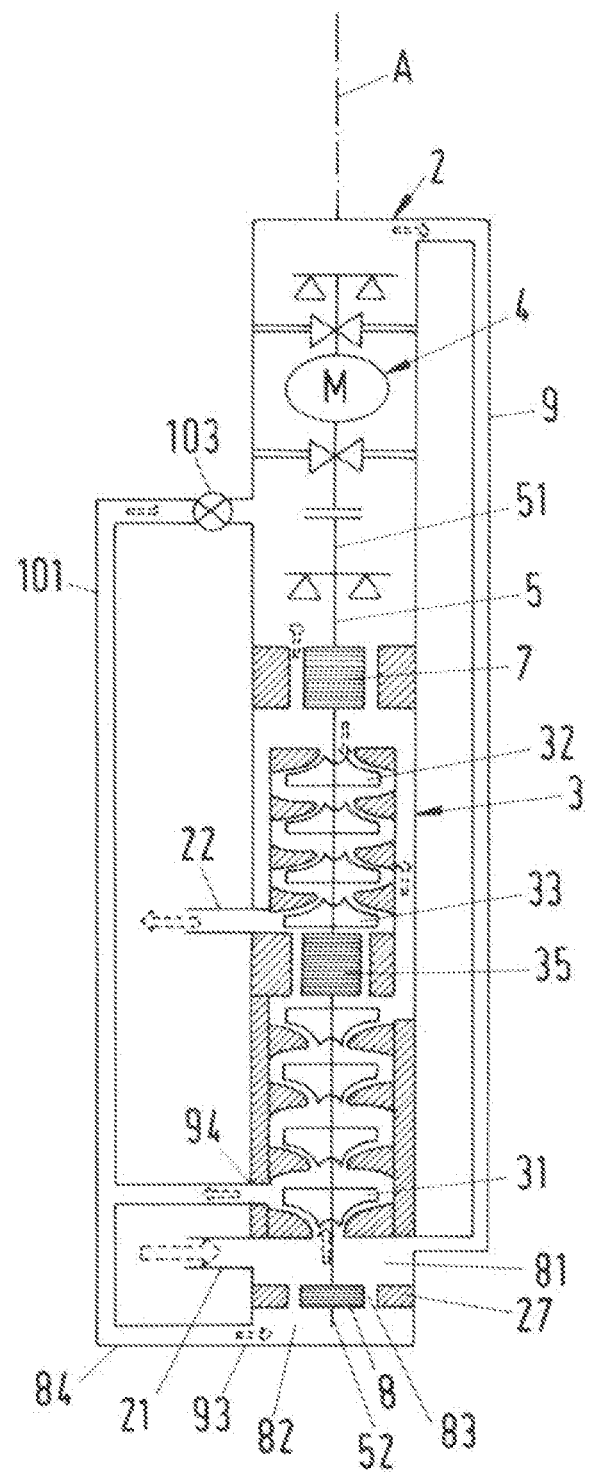
FIG. 9 is a schematic cross-sectional view of a fifth embodiment of a process fluid lubricated pump according to the invention.

FIG. 9 shows a schematic cross-sectional view of a fifth embodiment of a process fluid lubricated pump 1 according to the invention.

In the following description of the fifth embodiment of the process fluid lubricated pump 1 only the differences to the first, the second, the third and the fourth embodiment are explained in more detail. The explanations with respect to the first embodiment, the second embodiment, the third embodiment and the fourth embodiment are also valid in the same way or in analogously the same way for the fifth embodiment. Same reference numerals designate the same features that have been explained with reference to the first, the second, the third and the fourth embodiment or functionally equivalent features. In particular, the drive unit explained with reference to FIG. 2 can also be used for the fifth embodiment.

The fifth embodiment of the pump 1 is similar to the second embodiment of the pump 1 shown in FIG. 3. However, in the fifth embodiment of the pump 1 there is provided only the first throttle bush 8 defining the first throttle front side 81 and the first throttle back side 82, but no second throttle bush. Accordingly, there is provided only the first stationary throttle part 27 and the first throttle passage 83, but no second stationary throttle part and no second throttle passage. The supply line 84, which is in fluid communication with the first intermediate take-off 94, is connected to the third port 93, which is arranged at the first throttle back side 82.

Figure 10:
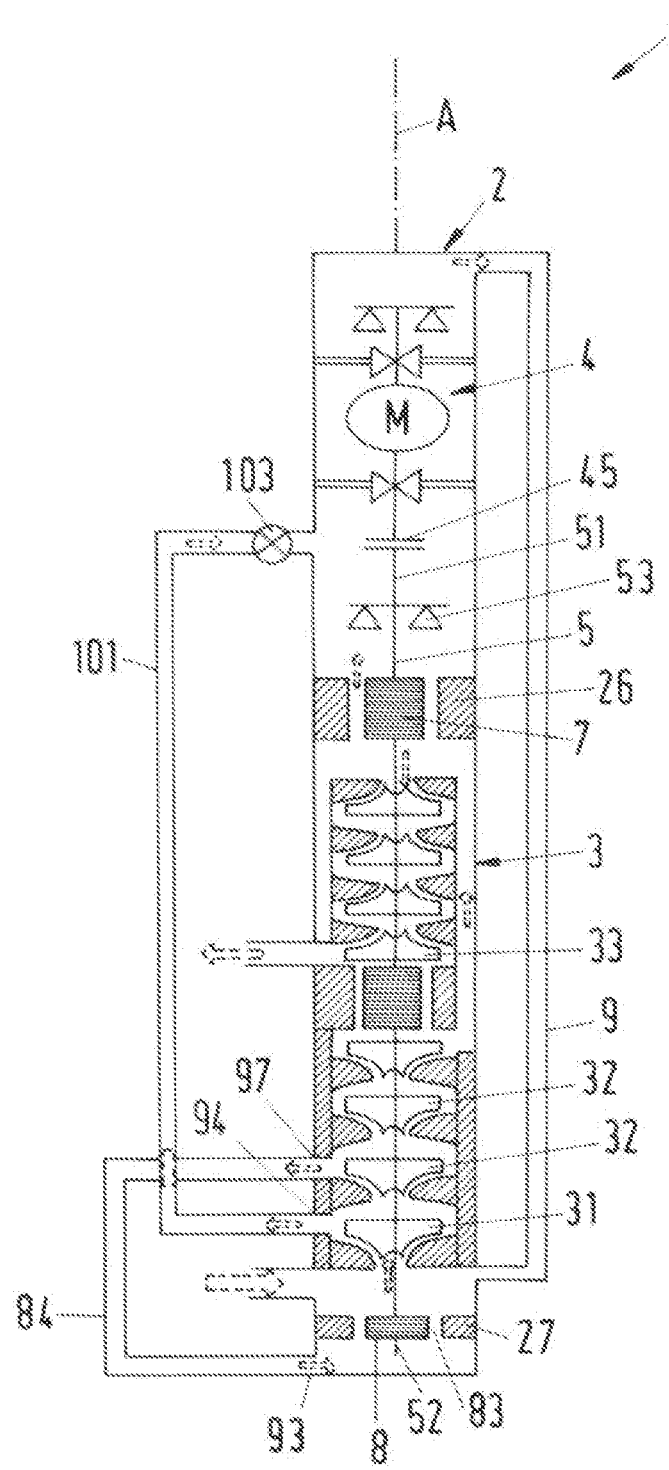
FIG. 10 is a schematic cross-sectional view of a variant of the fifth embodiment.

FIG. 10 shows a cross-sectional view of a variant of the fifth embodiment of the pump 1. According to this variant, there is a second intermediate take-off 97, to which the supply line 84 is connected. The second intermediate take-off 97 is arranged at the discharge side of the second stage impeller 32, i.e. the first intermediate stage impeller 32. In other variants the second intermediate take-off 97 can be arranged at the discharge side of any of the other intermediate stage impellers 32 or at the discharge side of the last stage impeller 33.

In other embodiments the supply line 84 and the cooling line 101 are also connected to different first and second intermediate take-offs 94, 97, respectively, but the cooling line 101 is connected to the second intermediate take-off 97 and the supply line 84 is connected to the first intermediate take-off 94.

Figure 11:
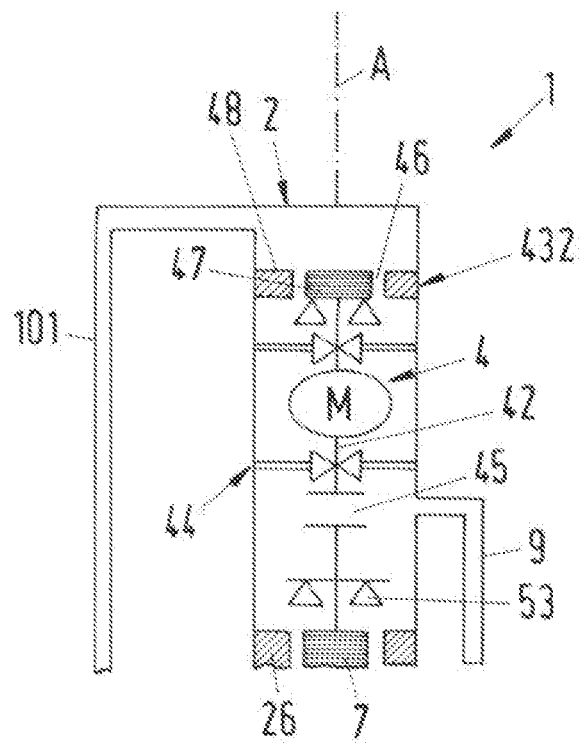
FIG. 11 is a schematic cross-sectional view of a sixth embodiment of a process fluid lubricated pump according to the invention.
Figure 12:
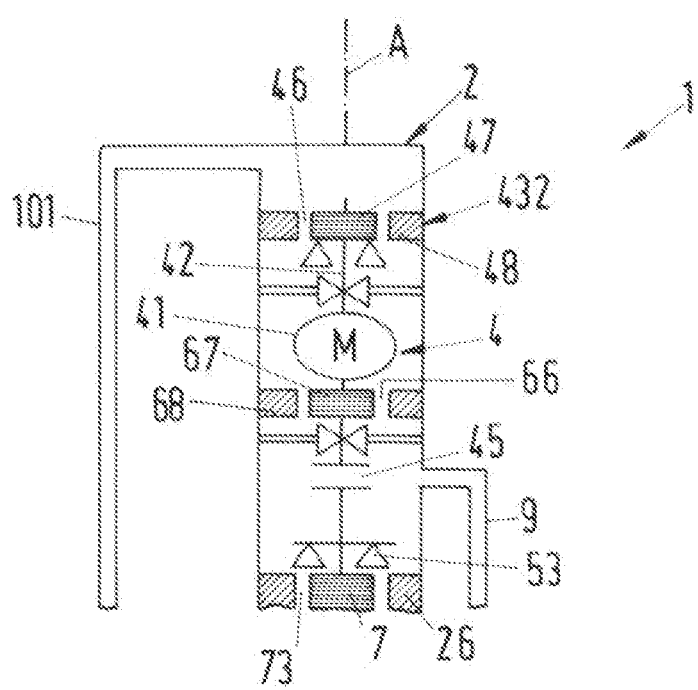
FIG. 12 is a schematic representation of a first variant of the sixth embodiment.
Figure 13:
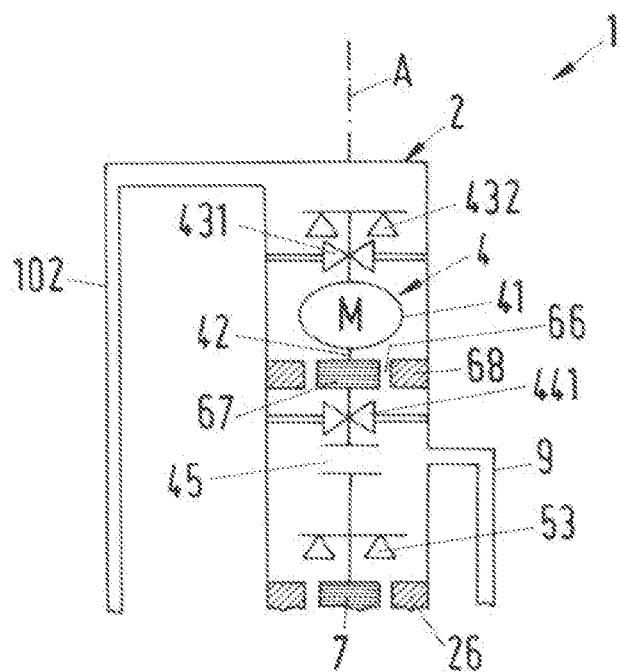
FIG. 13 is a schematic representation of a second variant of the sixth embodiment.
Figure 14:
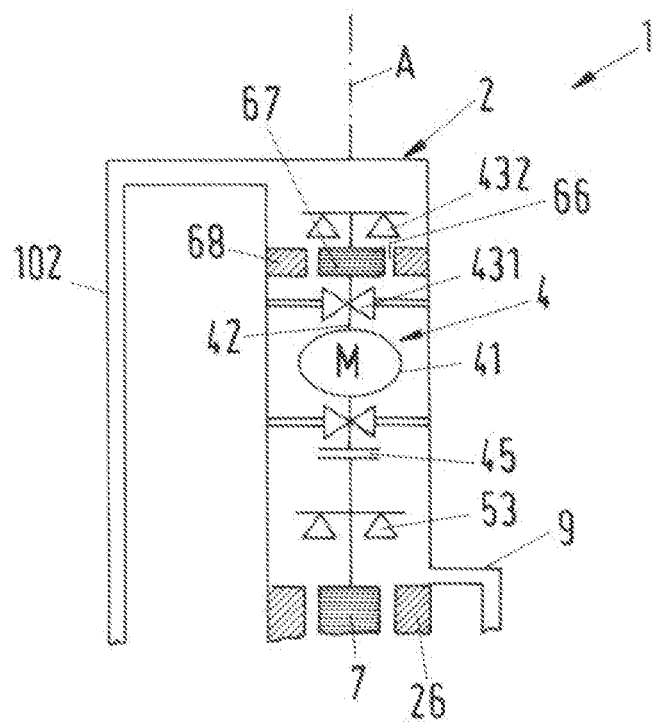
FIG. 14 is a schematic representation of a third variant of the sixth embodiment.

FIG. 11 shows a schematic cross-sectional view of a sixth embodiment of a process fluid lubricated pump 1 according to the invention. FIG. 12-FIG. 14 show three variants of the sixth embodiment in a schematic cross-sectional view.

In the following description of the sixth embodiment of the process fluid lubricated pump 1 and its variants only the differences to the first, the second, the third, the forth and the fifth embodiment are explained in more detail. The explanations with respect to the first embodiment, the second embodiment, the third embodiment, the fourth embodiment and the fifth embodiment are also valid in the same way or in analogously the same way for the sixth embodiment. Same reference numerals designate the same features that have been explained with reference to the first, the second, the third, the fourth and the fifth embodiment or functionally equivalent features.

The sixth embodiment of the pump 1 is different from the other embodiments by the configuration of the drive unit 4. Therefore, in FIG. 11-FIG. 14 only the upper part of the pump 1 comprising the drive unit 4 is shown. The lower part, which is not shown in FIG. 11-FIG. 14 can be configured as described hereinbefore with respect to the other embodiments of the pump 1 and their variants.

According to the sixth embodiment of the pump 1 the restriction of the flow through the cooling line 101 is achieved by the design of the drive unit 4, so that there is no need for the flow restrictor 103 in the cooling line 101. Therefore, the drive unit 4 comprises at least one throttle gap 46 which is configured to control the flow of the process fluid from the cooling line 101 through the drive unit 4. The drive unit 4 can comprise a throttle sleeve 47, which is fixedly connected to the drive shaft 42 in a torque proof manner and rotates with the drive shaft 42. The throttle sleeve 47 is surrounded by a third stationary part 48 being stationary with respect to the common housing 2 so that the annular throttle gap 46 is formed between the outer surface of the throttle sleeve 47 and the third stationary part 48.

As it is shown in FIG. 11 the throttle gap 46 can be integrated into the axial bearing 432 of the drive unit 4. In particular, when the axial bearing 432 is configured as a double acting or single acting axial tilting pad bearing, the thrust collar of the axial bearing 432 can function as the throttle sleeve 47. The thrust collar of the axial bearing 432 is a collar, which is fixed to the drive shaft 42 in a torque proof manner, and with which the pads of the axial bearing 432 interact to provide the support of the drive shaft 42 with respect to the axial direction A. As it is shown in FIG. 11, the axial bearing 432 can be configured as a single acting axial bearing 432. In a single acting axial bearing 432 pads are disposed only on one side of the thrust collar.

FIG. 12 shows a schematic representation of a first variant of the sixth embodiment of the pump 1. In this first variant an additional second throttle gap 66 is disposed in the drive unit 4, which is arranged between the electric motor 41 and the second motor bearing unit 44. The drive unit 4 comprises a second throttle sleeve 67, which is fixedly connected to the drive shaft 42 in a torque proof manner and rotates with the drive shaft 42. The second throttle sleeve 67 is arranged between the electric motor 41 and the second motor bearing unit 44 and surrounded by a fourth stationary part 68 being stationary with respect to the common housing 2 so that the annular second throttle gap 66 is formed between the outer surface of the second throttle sleeve 67 and the fourth stationary part 68.

FIG. 13 shows a schematic representation of a second variant of the sixth embodiment of the pump 1. In the second variant only the second throttle gap 66 is provided, which is formed between the second throttle sleeve 67 and the fourth stationary part 68. Here, the axial bearing 432 does not comprise a throttle gap.

FIG. 14 shows a schematic representation of a third variant of the sixth embodiment of the pump 1. The third variant is similar to the second variant, however in the third variant the second throttle gap 66 is arranged in the first motor bearing unit 43 between the upper radial bearing 431 and the axial bearing 432, i.e. the second throttle sleeve 67 and the forth stationary part 68 are arranged between the upper radial bearing 431 and the axial bearing 432.

The process fluid lubricated pump 1 according to embodiments of the invention is particularly suited as a water injection pump in seawater injection systems, especially in such systems, which are deployed on the sea ground.

What is claimed:

1. A process fluid lubricated pump for conveying a process fluid, comprising:
    a common housing;
    a pump unit arranged in the common housing;
    a balance drum and a drive unit arranged in the common housing, the common housing comprising an inlet and an outlet for the process fluid,
    the pump unit comprising a pump shaft extending from a drive end to a non-drive end of the pump shaft and configured to rotate about an axial direction, at least a first stage impeller fixedly mounted on the pump shaft, and a last stage impeller fixedly mounted on the pump shaft, the drive unit configured to exert torque on the drive end of the pump shaft to drive the rotation of the pump shaft, the balance drum fixedly connected to the pump shaft between the pump unit and the drive end of the pump shaft, the balance drum defining a drum front side facing the pump unit and a drum back side, a relief passage disposed between the balance drum and a first stationary part configured to be stationary with respect to the common housing, the relief passage extending from the drum front side to the drum back side, and the pump shaft radially supported in a non-contacting manner during operation of the pump;

at most one hydrodynamic radial pump bearing to support the pump shaft, the at most one radial pump bearing being arranged at the non-drive end or at the drive end of the pump shaft; and at least one hydrostatic support device to radially support the pump shaft, the hydrostatic support device configured to provide the support by the Lomakin effect.

2. The pump in accordance with claim 1, wherein the pump unit is configured without a hydrodynamic radial pump bearing, and the hydrostatic support device comprises a first throttle bush, which is fixedly connected to the pump shaft between the first stage impeller and the non-drive end of the pump shaft or at the non-drive end, the first throttle bush defining a first throttle front side facing the first stage impeller and a first throttle back side, a first throttle passage is disposed between the first throttle bush and a first stationary throttle part configured to be stationary with respect to the common housing, the first throttle passage extending from the first throttle front side to the first throttle back side, and a supply line is configured to supply pressurized process fluid to the first throttle back side.

3. The pump in accordance with claim 2, wherein a second throttle bush is fixedly connected to the pump shaft between the first throttle bush and the non-drive end of the pump shaft or at the non-drive end, the second throttle bush defining a second throttle back side, being different from the first throttle back side, a second throttle passage is disposed between the second throttle bush and a second stationary throttle part configured to be stationary with respect to the common housing, the second throttle passage extending from the first throttle back side to the second throttle back side.

4. The pump in accordance with claim 2, wherein the supply line is in fluid communication with a first intermediate take-off arranged at a discharge side of the first stage impeller.

5. The pump in accordance with claim 1, wherein the pump is a seal-less pump without a mechanical seal.

6. The pump in accordance with claim 1 wherein a cooling line is configured to supply pressurized process fluid to the drive unit.

7. The pump in accordance with claim 6, wherein the cooling line is in fluid communication with a first intermediate take-off arranged at a discharge side of the first stage impeller.

8. The pump in accordance with claim 6, wherein the drive unit comprises a drive shaft, an electric motor configured to rotate the drive shaft about the axial direction, a first and an second motor bearing unit to support the drive shaft, the drive shaft is connected to the drive end of the pump shaft, the electric motor is arranged between the first motor bearing unit and the second motor bearing unit, and the drive unit is configured to receive the process fluid from the cooling line for at least lubricating the first and the second motor bearing unit.

9. The pump in accordance with claim 8, wherein the drive unit comprises at least one throttle gap, which is configured to control the flow of the process fluid from the cooling line through the drive unit.

10. The pump in accordance with claim 9, wherein the first or the second motor bearing unit comprises an axial bearing, wherein the axial bearing is configured to comprise the at least one throttle gap.

11. The pump in accordance with claim 1, wherein the first stage impeller is one of a first set of impellers and the last stage impeller is one of a second set of impellers, and the first set of impellers and the second set of impellers are arranged in a back-to-back arrangement, so that an axial thrust generated by the first set of impellers is directed opposite to an axial thrust generated by the second set of impellers.

12. The pump in accordance with claim 11, further comprising a center bush, fixedly connected to the pump shaft between the first set of impellers and the second set of impellers, a balancing passage is disposed between the center bush and a second stationary part configured to be stationary with respect to the common housing.

13. The pump in accordance with claim 1, wherein the pump is a vertical pump with the pump shaft extending in the direction of gravity, and the drive unit is arranged on top of the pump unit.

14. The pump in accordance with claim, 1 wherein the pump is a subsea pump.

15. The pump in accordance with claim 1, wherein at least one intermediate stage impeller is fixedly mounted on the pump shaft between the first stage impeller and the last stage impeller.

16. The pump in accordance with claim 15, wherein the supply line is in fluid communication with a first intermediate take-off arranged at a discharge side of any of the intermediate stage impellers.

17. The pump in accordance with claim, 1 wherein the pump is a subsea pump configured to be installed on a sea ground.

* * * * *